(12) United States Patent
Alexander et al.

(10) Patent No.: US 7,921,651 B2
(45) Date of Patent: Apr. 12, 2011

(54) OPERATION OF DUAL GAS TURBINE FUEL SYSTEM

(75) Inventors: Michael J. Alexander, Simpsonville, SC (US); Rahul Mohan Joshi, Orlando, FL (US); Robert J. Iasillo, Simpsonville, SC (US); Jitendra Morankar, Greenville, SC (US)

(73) Assignee: General Electric Company, Schenectady, NY (US)

( * ) Notice: Subject to any disclaimer, the term of this patent is extended or adjusted under 35 U.S.C. 154(b) by 515 days.

(21) Appl. No.: 12/114,911

(22) Filed: May 5, 2008

(65) Prior Publication Data

US 2009/0272118 A1     Nov. 5, 2009

(51) Int. Cl.
   *F02C 7/22*     (2006.01)
   *F02C 7/26*     (2006.01)
(52) U.S. Cl. .......................................... 60/776; 60/772
(58) Field of Classification Search .................. 60/772, 60/776, 739, 734, 39.463, 39.465
See application file for complete search history.

(56) References Cited

U.S. PATENT DOCUMENTS

| | | | |
|---|---|---|---|
| 3,577,877 A * | 5/1971 | Warne | 60/39.281 |
| 4,949,538 A | 8/1990 | Iasillo et al. | |
| 6,640,548 B2 * | 11/2003 | Brushwood et al. | 60/776 |
| 7,624,564 B2 * | 12/2009 | Stuttaford et al. | 60/39.281 |
| 7,770,400 B2 * | 8/2010 | Iasillo et al. | 60/776 |

* cited by examiner

*Primary Examiner* — Michael Cuff
*Assistant Examiner* — Craig Kim
(74) *Attorney, Agent, or Firm* — Sutherland Asbill & Brennan LLP

(57) ABSTRACT

The present application provides a method of operating a dual gas fuel delivery system comprising selecting a manifold and fuel flow split; setting the stroke of a high-energy gas control valve based on the fuel split; measuring the primary manifold nozzle pressure ratio across a primary manifold nozzle outlet; comparing the primary manifold nozzle pressure ratio against a primary manifold specification limit; adjusting the stroke of a primary low energy gas control valve to maintain the pressure ratio across the primary manifold nozzle outlet within the primary manifold specification limit; measuring the secondary manifold nozzle pressure ratio across a secondary manifold nozzle outlet; comparing the secondary manifold nozzle pressure ratio against a secondary manifold specification limit; and adjusting the stroke of a secondary low energy gas control valve to maintain the pressure ratio across the secondary manifold nozzle outlet within the secondary manifold specification limit.

6 Claims, 1 Drawing Sheet

OPERATION OF DUAL GAS TURBINE FUEL SYSTEM

CROSS-REFERENCE TO RELATED APPLICATIONS

The present application relates to U.S. patent application Ser. No. 12/114,893 entitled "Single Manifold Dual Gas Turbine Fuel System;" U.S. patent application Ser. No. 12/114,899 entitled "Independent Manifold Dual Gas Fuel System;" and U.S. patent application Ser. No. 12/114,905 entitled "Primary Manifold Dual Gas Fuel System." These applications are incorporated herein by reference.

TECHNICAL FIELD

The present application relates to gas turbine fuel systems and more particularly relates to methods of operating gas turbine fuel systems capable of delivering two or more gaseous fuels to a single manifold.

BACKGROUND OF THE INVENTION

Modern gas turbines require precise control of the fuel system. For example, a pressure drop across the fuel nozzles must be carefully maintained within a specified range in order to avoid combustor damage. In general, it may be difficult to operate a modern gas turbine on a normal, high-energy fuel (for example, natural gas) and a high hydrogen, low energy fuel (for example, syngas). What is desired, therefore, is a "dual gas" turbine fuel system that may both accommodate and carefully control a high-energy fuel, a low energy fuel, and a mix of high and low energy fuels.

The design of such a "dual gas" fuel system may be complicated by the different characteristics of the fuels. Operating a gas turbine with a low energy fuel requires a significantly higher volumetric flow rate than does operating a gas turbine with a high-energy fuel. Furthermore, a low energy fuel, which is typically derived from a gasification process, often may be supplied at a high temperature. These characteristics necessitate fuel system hardware that can accommodate and control large variations in both fuel temperature and volumetric flow rate. Unfortunately, this hardware may be large, complicated, and expensive. What is desired, therefore, is a method of operating a "dual gas" turbine system that uses smaller, standard, simplified hardware so as to save hardware costs, maintenance costs, and floor space.

BRIEF DESCRIPTION OF THE INVENTION

The present application thus provides a method of operating a dual gas fuel delivery system. The dual gas fuel delivery system may include (a) a low energy gas delivery system comprising a low energy gas inlet, a fuel flow split, a low energy gas primary manifold outlet, and a low energy gas secondary manifold outlet; (b) a high-energy gas delivery system comprising a high-energy gas inlet and a high-energy gas primary manifold outlet; (c) a primary manifold comprising a primary manifold nozzle outlet; and (d) a secondary manifold comprising a secondary manifold nozzle outlet, wherein the low energy gas primary manifold outlet and the high-energy gas primary manifold outlet are coupled to the primary manifold, the low energy gas secondary manifold outlet is coupled to the secondary manifold, the low energy gas delivery system further comprises a primary low energy gas control valve between the gas split and the low energy gas primary manifold outlet, the low energy gas delivery system further comprises a secondary low energy gas control valve between the manifold split and the low energy gas secondary manifold outlet, and the high-energy gas delivery system further comprises a high-energy gas control valve between the high-energy gas inlet and the high-energy gas primary manifold outlet. The method of operating the dual gas fuel delivery system may include selecting a fuel split between the low energy gas delivery system and the high-energy gas delivery system; setting the stroke of the high-energy gas control valve based on the fuel flow split; measuring the primary manifold nozzle pressure ratio across the primary manifold nozzle outlet; comparing the primary manifold nozzle pressure ratio against a primary manifold specification limit; adjusting the stroke of the primary low energy gas control valve to maintain the pressure ratio across the primary manifold nozzle outlet within the primary manifold specification limit; measuring the secondary manifold nozzle pressure ratio across the secondary manifold nozzle outlet; comparing the secondary manifold nozzle pressure ratio against a secondary manifold specification limit; and adjusting the stroke of the secondary low energy gas control valve to maintain the pressure ratio across the secondary manifold nozzle outlet within the secondary manifold specification limit.

These and other features of the present application will become apparent to one of ordinary skill in the art upon review of the following detailed description when taken in conjunction with the drawings and the appended claims.

DETAILED DESCRIPTION OF THE INVENTION

Figure 1:
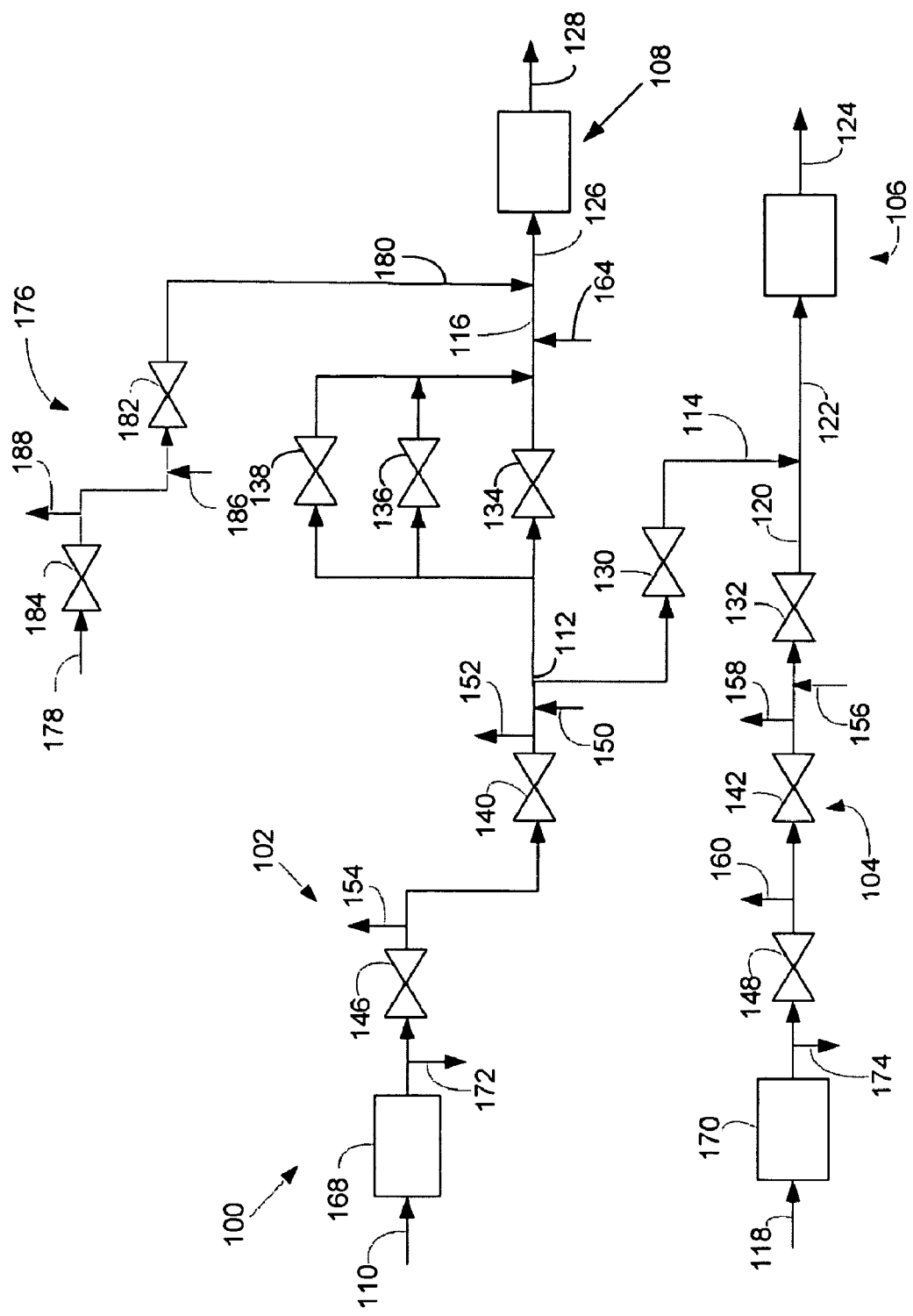
FIG. 1 is a flow diagram that depicts a primary manifold dual gas fuel system.

The present application provides a dual gas fuel delivery system and a method of operating the system.

I. Primary Manifold Dual Gas Fuel Delivery System

Referring now to the drawings, FIG. 1 shows a configuration of a primary manifold dual gas fuel system 100. The system 100 may be used to deliver a high-energy gas, a low energy gas, or a mixture of the high-energy gas and the low energy gas a turbine. Importantly, the system 100 may deliver both high-energy fuel and low energy fuel while only allowing the high-energy fuel to enter a single manifold. By delivering the high-energy fuel to only a single manifold, the system 100 may reduce the amount of energy stored in the manifolds and thereby reduce the risk of turbine over-speed.

The Gas Fuels

They system 100 may deliver a high-energy gas, a low energy gas, or a mixture of high-energy gas and low energy gas. The high-energy gas may have an energy value in a range from about 750 to about 2000 BTU/ft$_3$, even more desirably from about 900 to about 1500 BTU/ft$_3$, and yet even more desirably from about 1000 to about 1200 BTU/ft$_3$. The low energy gas may have an energy value in a range from about 75 to about 750 BTU/ft$_3$, even more desirably from about 150 to about 500 BTU/ft$_3$, and yet even more desirably from about 250 to about 350 BTU/ft$_3$. In a particular embodiment, the difference in energy values between the high-energy gas and the low energy gas is in a range from about 100 to about 1800 BTU/ft$_3$, even more desirably from about 300 to about 1200 BTU/ft$_3$, and yet even more desirably from about 600 to about 800 BTU/ft$_3$ The Delivery System The primary manifold dual gas fuel delivery system 100 may include a low energy gas delivery system 102, a high-energy gas delivery system 104, a primary manifold 106, and a secondary manifold 108. The secondary manifold 108 may have a size that is larger than the size of the primary manifold 106. For example, the secondary manifold 108 may have a larger volume and/or nozzle size as compared to the primary manifold 106. The relatively large size of the secondary manifold 108 and the relatively small size of the primary manifold 106 may allow the turbine to operate at a wide range of loads using either the low energy gas, the high-energy gas, or a mixture of the high-energy gas and the low energy gas.

The low energy gas delivery system 102 may include a low energy gas inlet 110, a gas split 112, a low energy gas primary manifold outlet 114, and a low energy gas secondary manifold outlet 116. The high-energy gas delivery system 104 may include a high-energy gas inlet 118 and a high-energy gas primary manifold outlet 120. The primary manifold 106 may include a primary manifold piping inlet 122 and a primary manifold nozzle outlet 124. The secondary manifold 108 may include a secondary manifold piping inlet 126 and a secondary manifold nozzle outlet 128. The low energy gas primary manifold outlet 114 and the high-energy gas primary manifold outlet 120 may be coupled to the primary manifold 106. For example, the low energy gas primary manifold outlet 114 and the high-energy gas primary manifold outlet 120 may merge into the primary manifold piping inlet 122. The low energy gas secondary manifold outlet 116 may be coupled to the secondary manifold 108. For example, the low energy gas secondary manifold outlet 116 may merge into the secondary manifold piping inlet 126.

The low energy gas delivery system 102 also may include primary low energy gas control valve 130 between the gas split 112 and the low energy gas primary manifold outlet 114. Likewise, the high-energy gas delivery system 104 also may include a high-energy gas control valve 132 between the high-energy gas inlet 118 and the high-energy gas primary manifold outlet 120. The gas control valves 130 and 132 may control the flow of fuel to the primary manifold 106 so that a precise pressure drop is maintained across the primary manifold nozzle outlet 124.

The low energy gas delivery system 102 also may include a secondary low energy gas control valve 134. The secondary low energy gas control valve 134 may be located between the gas split 112 and a low energy gas secondary manifold outlet 116. The secondary low energy gas control valve 134 may control the flow of fuel in the secondary manifold 108 so that a precise pressure drop is maintained across the secondary manifold nozzle outlet 128. The secondary low energy gas control valve 134 also may be used to stop the flow of gas through the secondary manifold 108.

The low energy gas delivery system 102 also may include any number of additional gas control valves. For example, the low energy gas delivery system 102 also may include a second secondary low energy gas control valve 136 and a third secondary low energy gas control valve 138. The control valves 136 and 138 may be located between the gas split 112 and a low energy gas secondary manifold outlet 116. The three control valves 134, 136 and 138 may operate in parallel. The use of multiple gas control valves may allow each control valve to be of a smaller size, which may in turn allow for the use of readily available gas control valves.

The low energy gas delivery system 102 also may include a low energy gas stop speed ratio valve 140 between the low energy gas inlet 110 and the gas split 112. Likewise, the high-energy gas delivery system 104 also may include a high-energy gas stop speed ratio valve 142 between the high-energy gas inlet 118 and the high-energy gas control valve 132. The stop speed ratio valves 140 and 142 may control the flow of fuel upstream of the gas control valves 130, 132, 134, 136 and 138 so that a constant reference pressure is maintained between the stop speed ratio valves 140 and 142 and the gas control valves 130, 132, 134, 136 and 138. By maintaining the areas of constant reference pressure immediately upstream of the gas control valves 130, 132, 134, 136 and 138, the rate of flow through the gas control valves may be calculated using the only the positions (effective areas) of the control valves.

The low energy gas delivery system 102 also may include a low energy gas stop valve 146 between the low energy gas inlet 110 and the low energy gas stop speed ratio valve 140. Likewise, the high-energy gas delivery system 104 also may include a high-energy gas stop valve 148 between the high-energy gas inlet 118 and the high-energy gas stop speed ratio valve 142. The stop valves 146 and 148 may be used to stop the flow of gas through the low energy gas delivery system 102 and the high-energy gas delivery system 104, respectively. For example, if the turbine is operating on high-energy gas only, the low energy gas stop valve 146 may stop the flow of gas through the low energy gas delivery system 102 so that only high-energy fuel will flow through the primary manifold 106. Furthermore, if the turbine is operating on low energy gas only, the high-energy gas stop valve 148 may stop the flow of gas through the high-energy gas delivery system 104 so that only low energy fuel will flow through the primary manifold 106 and the secondary manifold 108.

The low energy gas delivery system 102 also may include a primary low energy gas purge system between the low energy gas inlet 110 and the primary low energy gas control valve 130. The primary low energy gas purge system may include a primary low energy gas purge inlet 150, a first primary low energy gas purge vent 152, and a second primary low energy gas purge vent 154. The primary low energy gas purge inlet 150 may be located between the primary low energy gas control valve 130 and the low energy gas stop speed ratio valve 140, the first primary low energy gas purge vent 152 may be located between the primary low energy gas control valve 130 and the low energy gas stop speed ratio valve 140, and the second primary low energy gas purge vent 154 may be located between the low energy gas stop speed ratio valve 140 and the low energy gas stop valve 146. The primary low energy gas purge system may be used to reduce the risk of combustion when the low energy gas delivery system 102 is not in use. For example, the primary low energy gas purge inlet 150 and the primary low energy gas purge vents 152 and 154 may create an inert gas pressure buffer between the low energy gas stop valve 146 and the primary low energy gas control valve 130 in order isolate the low energy gas from the primary manifold 106.

The high-energy gas delivery system 104 also may include a high-energy gas purge system between the high-energy gas inlet 118 and the high-energy gas outlet 120. The high-energy gas purge system may include a high-energy gas purge inlet 156, a first high-energy gas purge vent 158, and a second high-energy purge vent 160. The high-energy gas purge inlet 156 may be located between the high-energy gas control valve 132 and the high-energy stop speed ratio valve 142, the first high-energy gas purge vent 158 may be located between the high-energy gas control valve 132 and the high-energy gas stop speed ratio valve 142, and the second high-energy gas purge vent 160 may be located between the high-energy gas stop speed ratio valve 142 and the high-energy gas stop valve 148. The high-energy gas purge system may be used to reduce the risk of combustion when the high-energy gas delivery system 104 is not in use. For example, the high-energy gas purge inlet 156 and the high-energy gas purge vents 158 and 160 may sweep the piping downstream of the high-energy gas stop valve 148 to purge high energy or low energy gas to reduce the risk of combustion.

The low energy gas delivery system 102 also may include a secondary low energy gas purge system between the secondary low energy gas control valve 134 and the low energy gas secondary manifold outlet 116. The secondary low energy gas purge system may include a secondary low energy gas purge inlet 164. The secondary low energy gas purge inlet 164 may be located between the secondary low energy gas control valve 134 and the secondary manifold nozzle outlet 128. The secondary manifold purge system may be used to reduce the risk of combustion when the secondary manifold 108 is not in use.

The low energy gas delivery system 102 also may include a low energy gas strainer 168 between the low energy gas inlet 110 and the low energy gas stop valve 146. Likewise, the high-energy gas delivery system 104 also may include a high-energy gas strainer 170 between the high-energy gas inlet 118 and the high-energy gas stop valve 148. The strainers 168 and 170 may filter debris out of the fuel in order to prevent problems such as clogging in the primary manifold dual gas fuel delivery system 100.

The low energy gas delivery system 102 also may contain a low energy gas bypass outlet 172 between the low energy gas inlet 110 and the low energy gas stop valve 146. Likewise, the high-energy gas delivery system 104 also may include a high-energy gas bypass outlet 174 between the high-energy gas inlet 118 and the high-energy has stop valve 148. The bypass outlets 172 and 174 may feed gas to systems such as a warm-up system and/or a flare system.

The primary manifold dual gas fuel delivery system 100 also may include a compressor discharge pressure system 176 ("CPD system"). The CPD system 176 may include a CPD air inlet 178 and a CPD air outlet 180. The CPD system 176 may be coupled to the secondary manifold 108. For example, CPD air outlet 180 may merge into the secondary manifold piping inlet 126. The CPD system 176 may be used to purge the secondary manifold 108 of gas, maintain a positive nozzle pressure ratio in the secondary manifold 108, and/or keep the secondary manifold nozzle outlet 128 cool.

The CPD system 176 may include a primary CPD valve 182 between the CPD air inlet 178 and the CPD air outlet 180. The CPD system 176 also may include a secondary CPD valve 184 between the CPD air inlet 178 and the primary CPD valve 182. The CPD valves 182 and 184 may control the flow of air to the secondary manifold 108 so that a precise pressure drop is maintained across the secondary manifold nozzle outlet 128.

The CPD system 176 also may include a CPD gas purge inlet 186 and a CPD gas purge vent 188. The CPD gas purge inlet 186 and the CPD gas purge vent 188 may be located between the secondary CPD valve 184 and the primary CPD valve 182. The CPD gas purge inlet 186 and the CPD gas purge vent 188 may be used to reduce the risk of combustion when the CPD system 176 is not in use. For example, the CPD gas purge inlet 186 and the CPD gas purge vent 188 may create an inert gas pressure buffer between the secondary CPD valve 184 and the primary CPD valve 182 in order isolate the low energy gas from the CPD air.

The primary manifold dual gas fuel delivery system 100 may be used to deliver two gas fuels to a turbine. A low energy gas may be fed to the low gas energy inlet 110 of the low energy gas delivery system 102. A first portion of the low energy gas then may be fed to the primary manifold piping inlet 122 of the primary manifold 106 from the low energy gas primary manifold outlet 114 of the low energy gas delivery system 102, and a second portion of the low energy gas may be fed to the secondary manifold piping inlet 126 of the secondary manifold 108 from the low energy gas secondary manifold outlet 116 of the low energy gas delivery system 102. A high-energy gas may be fed to the high-energy gas inlet 118 of the high-energy gas delivery system 104. The high-energy gas then may be fed to the primary manifold piping inlet 122 of the primary manifold 106 from the high-energy gas primary manifold outlet 120 of the high-energy gas delivery system 104.

The high-energy gas and the first portion of the low energy gas may be fed to the turbine from the primary manifold nozzle outlet 124 of the primary manifold 106. The second portion of the low energy gas may be fed to the turbine from the secondary manifold piping outlet 128 of the secondary manifold 108.

The method of delivering the two gas fuels to the turbine may include a step of passing the first portion of the low energy gas through the primary low energy gas control valve 130 after the step of feeding the low energy gas to the low energy gas delivery system 102 and before the step of feeding the first portion of the low energy gas to the primary manifold 106. The method also may include a step of passing the second portion of the low energy gas through the secondary low energy gas control valve 134, 136, and 138 after the step of feeding the low energy gas to the low energy gas delivery system 102 and before the step of feeding the second portion of the low energy gas to secondary manifold 108. Furthermore, the method may include a step of passing the low energy gas through the low energy gas stop speed ratio valve 140 after the step of feeding the low energy gas to the low energy gas delivery system 102 and before the steps of passing the first portion of the low energy gas through the primary low energy gas control valve 130 and passing the second portion of the low energy gas through the secondary low energy gas control valve 134, 136, and 138. Finally, the method of delivering the two gas fuels to the turbine may include passing the low energy gas through the low energy gas stop valve 146 after the step of feeding the low energy gas to the low energy gas delivery system 102 and before the step of passing the low energy gas through the low energy gas stop speed ratio valve 140.

The method of delivering the two gas fuels to the turbine may include a step of passing the high-energy gas through the high-energy gas control valve 132 after the step of feeding the high-energy gas to the high-energy gas delivery system 104 and before the step of feeding the high-energy gas to the primary manifold 106. The method also may include a step of passing the high-energy gas through the high-energy gas stop speed ratio valve 142 after the step of feeding the high-energy gas to the high-energy gas delivery system 104 and before the step of passing the high-energy gas through the high-energy gas control valve 132. Finally, the method of delivering the two gas fuels to the turbine may include passing the high-energy gas through the high-energy gas stop valve 148 after the step of feeding the high-energy gas to the high-energy gas delivery system 104 and before the step of passing the high-energy gas through the high-energy gas stop speed ratio valve 142.

II. Fuel System Operation

The primary manifold fuel delivery system 100 described above may be operated in three different modes: (1) a 100% high-energy gas mode; (2) a 100% low energy gas mode; and (3) a co-fire mode.

During the operation of the fuel delivery system, the stroke of the gas control valves may be adjusted based on closed loop control to maintain the pressure ratio across the manifold nozzle outlets within a manifold specification limit. If fuel is flowing through two manifolds, then the stroke of the gas control valves may be adjusted in order to maintain equal pressure ratios across the manifold nozzle outlets.

The stroke of the gas control valves also may be adjusted based on open loop control using the physics of the flow through the nozzles. For example, the fuel stroke reference (FSR) may be calculated as the sum of the primary manifold FSR ($FSR_p$) and the secondary manifold FSR ($FSR_s$). The $FSR_p$ and $FSR_s$ may be directly proportional to the area of the primary nozzle passage and area of the secondary nozzle passage, respectively.

If the pressure ratio across the manifold is found to be outside the specification limit, a fired shut down may be initiated in order to protect the fuel system and turbine.

High-Energy Gas Mode

The method of operating the primary manifold fuel delivery system 100 in 100% high-energy gas mode may include closing the low energy gas control valves 130, 134, 136, and 138; measuring the primary manifold nozzle pressure ratio across the primary manifold nozzle outlet 124; comparing the primary manifold nozzle pressure ratio against a primary manifold specification limit; and adjusting the stroke of the high-energy gas control valve 132 to maintain the pressure ratio across the primary manifold nozzle outlet 124 within the primary manifold specification limit. For example, if the nozzle pressure ratio is below the specification limit, the high-energy gas control valve 132 may be adjusted to a higher stroke to pass more gas through the primary manifold 106. Furthermore, if the nozzle pressure ratio is above the specification limit, the high-energy gas control valve 132 may be adjusted to a lower stroke to pass less gas through the primary manifold 106.

The method of operating the primary manifold fuel delivery system 100 in 100% high-energy gas mode also may include measuring the secondary manifold nozzle pressure ratio across the secondary manifold nozzle outlet 128; comparing the secondary manifold nozzle pressure ratio against a secondary manifold specification limit; and adjusting the stroke of the CPD valves 182 and/or 184 to maintain the pressure ratio across the secondary manifold nozzle outlet 128 within the secondary manifold specification limit. For example, if the nozzle pressure ratio is below the specification limit, the CPD valves 182 and/or 184 may be adjusted to a higher stroke to pass more air through the secondary manifold 108. Likewise, if the nozzle pressure ratio is above the specification limit, the CPD valves 182 and/or 184 may be adjusted to a lower stroke to pass less air through the secondary manifold 108.

The method of operating the primary manifold fuel delivery system 100 in 100% high-energy gas mode also may include closing the low energy gas stop speed ratio valve 140; measuring the pressure of the high-energy gas between the high-energy gas stop speed ratio valve 142 and the high-energy gas control valve 132; comparing the pressure of the high-energy gas against a high-energy gas reference pressure limit; and adjusting the stroke of the high-energy gas stop speed ratio valve 142 to maintain the pressure of the high-energy gas within the high-energy gas reference pressure limit. For example, if the pressure of the high-energy gas is below the high-energy gas reference pressure limit, the high-energy gas stop speed ratio valve 142 may be adjusted to a higher stroke to pass more high-energy gas through the high-energy gas stop speed ratio valve 142. Likewise, if the pressure of the high-energy gas is above the high-energy gas reference pressure limit, the high-energy gas stop speed ratio valve 142 may be adjusted to a lower stroke to pass less high-energy gas through the high-energy gas stop speed ratio valve 142.

The method of operating the primary manifold fuel delivery system 100 in 100% high-energy gas mode also may include closing the low energy gas stop speed ratio valve 140 and the low energy gas stop valve 146. The method of operating the fuel systems also may include removing the low energy gas from between the low energy gas stop speed ratio valve 146 and the low energy gas stop valve 140 using the second low energy gas purge vent 154. The method of operating the fuel systems also may include creating an inert gas pressure buffer between the low energy gas stop speed ratio valve 140 and the low energy gas control valves 130, 134, 136, and 138 using the low energy gas purge inlet 150 and the first low energy gas purge vent 152.

Low Energy Gas Mode

The method of operating the primary manifold fuel delivery system 100 in 100% low energy gas mode may include closing the high-energy gas control valve 132; measuring the primary manifold nozzle pressure ratio across the primary manifold nozzle outlet 124; comparing the primary manifold nozzle pressure ratio against a primary manifold specification limit; and adjusting the stroke of the primary low energy gas control valve 130 to maintain the pressure ratio across the primary manifold nozzle outlet 124 within the primary manifold specification limit. For example, if the nozzle pressure ratio is below the specification limit, the primary low energy gas control valve 130 may be adjusted to a higher stroke to pass more gas through the primary manifold 106. Furthermore, if the nozzle pressure ratio is above the specification limit, the primary low energy gas control valve 130 may be adjusted to a lower stroke to pass less gas through the primary manifold 106. If the nozzle pressure ratios are between the specification limits manifold split control valve 130 will operate to manage equal nozzle pressure ratios on each manifold.

The method of operating the primary manifold fuel delivery system 100 in 100% low energy gas mode also may include closing the CPD valve 182; measuring the secondary manifold nozzle pressure ratio across the secondary manifold nozzle outlet 128; comparing the secondary manifold nozzle pressure ratio against a secondary manifold specification limit; and adjusting the stroke of the secondary low energy gas control valves 134, 136 and 138 to maintain the pressure ratio across the secondary manifold nozzle outlet 128 within the secondary manifold specification limit. For example, if the nozzle pressure ratio is below the specification limit, the secondary low energy gas control valves 134, 136 and 138 may be adjusted to a higher stroke to pass more gas through the secondary manifold 108. Furthermore, if the nozzle pressure ratio is above the specification limit, the secondary low energy gas control valves 134, 136 and 138 may be adjusted to a lower stroke to pass less gas through the secondary manifold 108.

The method of operating the primary manifold fuel delivery system 100 in 100% low energy gas mode also may include closing the high-energy gas stop speed ratio valve 142; measuring the pressure of the low energy gas between either the low energy gas stop speed ratio valve 140 and the primary low energy gas control valve 130 or the low energy gas stop speed ratio valve 140 and the secondary low energy gas control valve 134; comparing the pressure of the low energy gas against a low energy gas reference pressure limit; and adjusting the stroke of the low energy gas stop speed ratio valve 140 to maintain the pressure of the low energy gas within the low energy gas reference pressure limit. For example, if the pressure of the low energy gas is below the low energy gas reference pressure limit, the low energy gas stop speed ratio valve 140 may be adjusted to a higher stroke to pass more low energy gas through the low energy gas stop speed ratio valve 140. Likewise, if the pressure of the low energy gas is above the low energy gas reference pressure limit, the low energy gas stop speed ratio valve 140 may be adjusted to a lower stroke to pass less low energy gas through the low energy gas stop speed ratio valve 140.

The method of operating the fuel delivery systems in 100% low energy gas mode also may include closing the high-energy gas stop speed ratio valve 142 and the high-energy gas stop valve 146. The method of operating the fuel systems also may include removing the high-energy gas from between the high-energy gas stop speed ratio valve 142 and the high-energy gas stop valve 146 using the second high-energy gas purge vent 160. The method of operating the fuel systems also may include removing the high energy gas from between the high-energy gas stop speed ratio valve 142 and the high-energy gas control valve 132 using the first high-energy gas purge vent 158. The method of operating the fuel systems also may include purging primary manifold 106 with inert gas using the high energy purge inlet 156. The method of operating the fuel delivery system 100 also may include removing the CPD air from between the CPD valve 184 and the CPD valve 182 using the CPD gas purge inlet 186 and the CPD gas purge vent 188.

Co-Fire Mode

The method of operating the primary manifold fuel delivery system 100 in co-fire mode may include selecting a fuel flow split between the high-energy gas and the low energy gas; adjusting the stroke of the high-energy gas control valve 132 based on the desired primary fuel flow split; measuring the primary manifold nozzle pressure ratio across the primary manifold nozzle outlet 124; comparing the primary manifold nozzle pressure ratio against a primary manifold specification limit and target; and adjusting the stroke of the primary low energy gas control valve 130 to maintain the pressure ratio across the primary manifold nozzle outlet 124 within the primary manifold specification limit or to meet the target pressure ratio. For example, if the nozzle pressure ratio is below the specification limit, the primary low energy gas control valve 130 may be adjusted to a higher stroke to pass more gas through the primary manifold 106. Furthermore, if the nozzle pressure ratio is above the specification limit the primary low energy gas control valve 130 may be adjusted to a lower stroke to pass less gas through the primary manifold 106. If the measure primary nozzle pressure ratio is between the specification limits, control valve 130 will operate to manage equal nozzle pressure ratios between the primary and secondary manifolds.

The method of operating the primary manifold fuel delivery system 100 in co-fire mode also may include closing the CPD valve 182; measuring the secondary manifold nozzle pressure ratio across the secondary manifold nozzle outlet 128; comparing the secondary manifold nozzle pressure ratio against a secondary manifold specification limit; and adjusting the stroke of the secondary low energy gas control valves 134, 136 and 138 to maintain the pressure ratio across the secondary manifold nozzle outlet 128 within the secondary manifold specification limit. For example, if the nozzle pressure ratio is below the specification limit, the secondary low energy gas control valves 134, 136 and 138 may be adjusted to a higher stroke to pass more gas through the secondary manifold 108. Furthermore, if the nozzle pressure ratio is above the specification limit, the secondary low energy gas control valves 134, 136 and 138 may be adjusted to a lower stroke to pass less gas through the secondary manifold 108. if the measured secondary nozzle pressure ratio is between the specification limits, control valve 130 will operate to manage equal nozzle pressure ratios between the primary and the secondary manifolds.

The method of operating the primary manifold fuel delivery system 100 in co-fire mode also may include measuring the pressure of the high-energy gas between the high-energy gas stop speed ratio valve 142 and the high-energy gas control valve 132; comparing the pressure of the high-energy gas against a high-energy gas reference pressure limit; and adjusting the stroke of the high-energy gas stop speed ratio valve 142 to maintain the pressure of the high-energy gas within the high-energy gas reference pressure limit. For example, if the pressure of the high-energy gas is below the high-energy gas reference pressure limit, the high-energy gas stop speed ratio valve 142 may be adjusted to a higher stroke to pass more high-energy gas through the high-energy gas stop speed ratio valve 142. Likewise, if the pressure of the high-energy gas is above the high-energy gas reference pressure limit, the high-energy gas stop speed ratio valve 142 may be adjusted to a lower stroke to pass less high-energy gas through the high-energy gas stop speed ratio valve 142.

The method of operating the primary manifold fuel delivery system 100 in co-fire mode also may include measuring the pressure of the low energy gas between either the low energy gas stop speed ratio valve 140 and the primary low energy gas control valve 130 or the low energy gas stop speed ratio valve 140 and the secondary low energy gas control valve 134; comparing the pressure of the low energy gas against a low energy gas reference pressure limit; and adjusting the stroke of the low energy gas stop speed ratio valve 140 to maintain the pressure of the high-energy gas within the high-energy gas reference pressure limit. For example, if the pressure of the low energy gas is below the low energy gas reference pressure limit, the low energy gas stop speed ratio valve 140 may be adjusted to a higher stroke to pass more low energy gas through the low energy gas stop speed ratio valve 140. Likewise, if the pressure of the low energy gas is above the low energy gas reference pressure limit, the low energy gas stop speed ratio valve 140 may be adjusted to a lower stroke to pass less low energy gas through the low energy gas stop speed ratio valve 142.

The method of operating the primary manifold fuel delivery system 100 in co-fire mode also may include closing the CPD valve 182 and 184. The method of operating the fuel delivery system 100 also may include removing the CPD air from between the CPD valve 184 and the CPD valve 182 using the CPD gas purge inlet 186 and the CPD gas purge vent 188.

It should be understood that the foregoing relates only to the preferred embodiments of the present application and that numerous changes and modifications may be made herein without departing from the general spirit and scope of the invention as defined by the following claims and the equivalents thereof.

We claim:

1. A method of operating a fuel delivery system comprising (a) a low energy gas delivery system comprising a low energy gas inlet, a fuel and manifold flow split, a low energy gas primary manifold outlet, and a low energy gas secondary manifold outlet; (b) a high-energy gas delivery system comprising a high-energy gas inlet and a high-energy gas primary manifold outlet; (c) a primary manifold comprising a primary manifold nozzle outlet; and (d) a secondary manifold comprising a secondary manifold nozzle outlet, wherein the low energy gas primary manifold outlet and the high-energy gas primary manifold outlet are coupled to the primary manifold, the low energy gas secondary manifold outlet is coupled to the secondary manifold, the low energy gas delivery system further comprises a primary low energy gas control valve between the gas split and the low energy gas primary manifold outlet, the low energy gas delivery system further comprises a secondary low energy gas control valve between the gas split and the low energy gas secondary manifold outlet, and the high-energy gas delivery system further comprises a high-energy gas control valve between the high-energy gas inlet and the high-energy gas primary manifold outlet, the method of operating comprising:

selecting a fuel flow split between the low energy gas delivery system and the high-energy gas delivery system;

setting the stroke of the high-energy gas control valve based on the fuel split;

measuring the primary manifold nozzle pressure ratio across the primary manifold nozzle outlet;

comparing the primary manifold nozzle pressure ratio against a primary manifold specification limit;

adjusting the stroke of the primary low energy gas control valve to maintain the pressure ratio across the primary manifold nozzle outlet within the primary manifold specification limit;

adjusting the stroke of the primary low energy gas control valve to maintain equal nozzle pressure ratio across the primary and secondary manifold nozzle outlets;

measuring the secondary manifold nozzle pressure ratio across the secondary manifold nozzle outlet;

comparing the secondary manifold nozzle pressure ratio against a secondary manifold specification limit; and adjusting the stroke of the secondary low energy gas control valve to maintain the pressure ratio across the secondary manifold nozzle outlet within the secondary manifold specification limit.

2. The method of operating of claim 1, wherein the low energy gas delivery system further comprises a low energy gas stop speed ratio valve between the low energy gas inlet and the manifold split, and the high-energy gas delivery system further comprises a high-energy gas stop speed ratio valve between the high-energy gas inlet and the high-energy gas control valve, the method of operating further comprising:

measuring the pressure of the low energy gas between the low energy gas stop speed ratio valve and the primary low energy gas control valve;

comparing the pressure of the low energy gas against a low energy gas reference pressure limit;

adjusting the stroke of the low energy gas stop speed ratio valve to maintain the pressure of the low energy gas within the low energy gas reference pressure limit;

measuring the pressure of the high-energy gas between the high-energy gas stop speed ratio valve and the high-energy gas control valve;

comparing the pressure of the high-energy gas against a high-energy gas reference pressure limit; and adjusting the stroke of the high-energy gas stop speed ratio valve to maintain the pressure of the high-energy gas within the high-energy gas reference pressure limit.

3. A method of operating a fuel delivery system comprising (a) a low energy gas delivery system comprising a low energy gas inlet, a manifold split, a low energy gas primary manifold outlet, and a low energy gas secondary manifold outlet; (b) a high-energy gas delivery system comprising a high-energy gas inlet and a high-energy gas primary manifold outlet; (c) a primary manifold comprising a primary manifold nozzle outlet; (d) a secondary manifold comprising a secondary manifold nozzle outlet; and (e) a compressor discharge pressure system comprising a compressor discharge pressure inlet and a compressor discharge pressure outlet, wherein the low energy gas primary manifold outlet and the high-energy gas primary manifold outlet are coupled to the primary manifold, the low energy gas secondary manifold outlet and the compressor discharge pressure outlet are coupled to the secondary manifold, the low energy gas delivery system further comprises a primary low energy gas control valve between the gas split and the low energy gas primary manifold outlet, the low energy gas delivery system further comprises a secondary low energy gas control valve between the gas split and the low energy gas secondary manifold outlet, the high-energy gas delivery system further comprises a high-energy gas control valve between the high-energy gas inlet and the high-energy gas primary manifold outlet, and the compressor discharge pressure system further comprises a compressor discharge pressure valve between the compressor discharge pressure inlet and the compressor discharge pressure outlet, the method of operating comprising:

closing the primary low energy gas control valve;

measuring the primary manifold nozzle pressure ratio across the primary manifold nozzle outlet;

comparing the primary manifold nozzle pressure ratio against a primary manifold specification limit;

adjusting the stroke of the high-energy gas control valve to maintain the pressure ratio across the primary manifold nozzle outlet within the primary manifold specification limit;

closing the secondary low energy gas control valve;

measuring the secondary manifold nozzle pressure ratio across the secondary manifold nozzle outlet;

comparing the secondary manifold nozzle pressure ratio against a secondary manifold specification limit; and adjusting the stroke of the compressor discharge pressure valve to maintain the pressure ratio across the secondary manifold nozzle outlet within the secondary manifold specification limit.

4. The method of operating of claim 3, wherein the low energy gas delivery system further comprises a low energy gas stop speed ratio valve between the low energy gas inlet and the manifold split, and the high-energy gas delivery system further comprises a high-energy gas stop speed ratio valve between the high-energy gas inlet and the high-energy gas control valve, the method of operating further comprising:

closing the low energy gas stop speed ratio valve;

measuring the pressure of the high-energy gas between the high-energy gas stop speed ratio valve and the high-energy gas control valve;

comparing the pressure of the high-energy gas against a high-energy gas reference pressure limit; and adjusting the stroke of the high-energy gas stop speed ratio valve to maintain the pressure of the high-energy gas within the high-energy gas reference pressure limit.

5. A method of operating a fuel delivery system comprising (a) a low energy gas delivery system comprising a low energy gas inlet, a manifold split, a low energy gas primary manifold outlet, and a low energy gas secondary manifold outlet; (b) a high-energy gas delivery system comprising a high-energy gas inlet and a high-energy gas primary manifold outlet; (c) a primary manifold comprising a primary manifold nozzle outlet; and (d) a secondary manifold comprising a secondary manifold nozzle outlet, wherein the low energy gas primary manifold outlet and the high-energy gas primary manifold outlet are coupled to the primary manifold, the low energy gas secondary manifold outlet is coupled to the secondary manifold, the low energy gas delivery system further comprises a primary low energy gas control valve between the manifold split and the low energy gas primary manifold outlet, the low energy gas delivery system further comprises a secondary low energy gas control valve between the manifold split and the low energy gas secondary manifold outlet, and the high-energy gas delivery system further comprises a high-energy gas control valve between the high-energy gas inlet and the high-energy gas primary manifold outlet, the method of operating comprising:

closing the high-energy gas control valve;

measuring the primary manifold nozzle pressure ratio across the primary manifold nozzle outlet;

comparing the primary manifold nozzle pressure ratio against a primary manifold specification limit;

adjusting the stroke of the primary low energy gas control valve to maintain the pressure ratio across the primary manifold nozzle outlet within the primary manifold specification limit;

adjusting the stroke of the primary low energy gas control valve to maintain equal nozzle pressure ratio across the primary and secondary manifold nozzle outlets;

measuring the secondary manifold nozzle pressure ratio across the secondary manifold nozzle outlet;

comparing the secondary manifold nozzle pressure ratio against a secondary manifold specification limit; and adjusting the stroke of the secondary low energy gas control valve to maintain the pressure ratio across the secondary manifold nozzle outlet within the secondary manifold specification limit.

6. The method of operating of claim 5, wherein the low energy gas delivery system further comprises a low energy gas stop speed ratio valve between the low energy gas inlet and the manifold split, and the high-energy gas delivery system further comprises a high-energy gas stop speed ratio valve between the high-energy gas inlet and the high-energy gas control valve, the method of operating further comprising:

closing the high-energy gas stop speed ratio valve;

measuring the pressure of the low energy gas between either the low energy gas stop speed ratio valve and the primary low energy gas control valve or the low energy gas stop speed ratio valve and the secondary low energy gas control valve;

comparing the pressure of the low energy gas against a low energy gas pressure reference pressure limit; and adjusting the stroke of the low energy gas stop speed ratio valve to maintain the pressure of the low energy gas within the low energy gas pressure reference pressure limit.

\* \* \* \* \*